United States Patent
Gellert et al.

(10) Patent No.: US 6,196,826 B1
(45) Date of Patent: Mar. 6, 2001

(54) SEEPAGE SYSTEM FOR AN INJECTION MOLDING APPARATUS

(75) Inventors: Jobst U. Gellert, Georgetown; Denis L. Babin, Acton; Helen Qun Zhuang, Mississauga, all of (CA)

(73) Assignee: Mold-Masters Limited, Georgetown (CA)

( * ) Notice: Subject to any disclaimer, the term of this patent is extended or adjusted under 35 U.S.C. 154(b) by 0 days.

(21) Appl. No.: 09/322,573

(22) Filed: May 28, 1999

(51) Int. Cl.[7] .................................................. B29C 45/22
(52) U.S. Cl. ........................ 425/215; 425/564; 425/566; 425/572
(58) Field of Search ................................ 425/562, 563, 425/564, 565, 566, 572, 588, 215

(56) References Cited

U.S. PATENT DOCUMENTS

| | | | |
|---|---|---|---|
| Re. 34,552 | 2/1994 | Krishnakumar et al. | 438/35.7 |
| 3,947,177 | 3/1976 | Eckardt | 425/130 |
| 4,026,518 | 5/1977 | Gellert | 251/330 |
| 4,035,466 | 7/1977 | Langecker | 264/328 |
| 4,082,512 | 4/1978 | Wingard et al. | 23/252 |
| 4,174,413 | 11/1979 | Yasuike | 428/35 |
| 4,376,625 | 3/1983 | Eckardt | 425/564 |
| 4,433,969 | 2/1984 | Gellert | 425/548 |
| 4,436,778 | 3/1984 | Dugal | 428/36 |
| 4,472,131 | 9/1984 | Ryder | 425/526 |
| 4,497,621 | 2/1985 | Kudert et al. | 425/145 |
| 4,525,134 | 6/1985 | McHenry et al. | 425/130 |
| 4,526,821 | 7/1985 | McHenry et al. | 428/35 |
| 4,541,982 | 9/1985 | Upmeier | 264/349 |
| 4,542,054 | 9/1985 | Fillmann | 428/68 |
| 4,550,043 | 10/1985 | Beck | 428/36 |
| 4,568,261 | 2/1986 | McHenry et al. | 425/145 |
| 4,609,516 | 9/1986 | Krishnakumar et al. | 264/255 |
| 4,615,925 | 10/1986 | Nilsson | 428/35 |
| 4,646,925 | 3/1987 | Nohara | 215/1 C |
| 4,657,496 | 4/1987 | Ozeki et al. | 425/130 |
| 4,701,292 | 10/1987 | Valyi | 264/255 |
| 4,710,118 | 12/1987 | Krishnakumar et al. | 425/130 |
| 4,715,802 | 12/1987 | Arai | 425/130 |
| 4,717,324 | 1/1988 | Schad et al. | 425/130 |
| 4,728,549 | 3/1988 | Shimizu | 428/35 |

(List continued on next page.)

FOREIGN PATENT DOCUMENTS

| | | | |
|---|---|---|---|
| 1165525 | 4/1917 | (CA) | B29F/1/03 |
| 3201710 | 8/1982 | (DE) | B29F/1/022 |
| 0 688 651 A1 | 12/1996 | (EP) | B29C/45/04 |
| 0 768 163 A1 | 4/1997 | (EP) | B29C/45/16 |
| 0 799 683 A2 | 10/1997 | (EP) | B29C/45/16 |
| 0 839 629 A1 | 8/1998 | (EP) | B29C/45/16 |
| 0 873 840 A1 | 10/1998 | (EP) | B29C/45/04 |
| 0 894 604 A1 | 2/1999 | (EP) | B29C/45/16 |
| WO 98/13187 | 4/1998 | (WO) | B29C/45/16 |

OTHER PUBLICATIONS

"High Performance Polyester Packaging for Foods & Beverages," *Technologies*, pp. 42–70.

*Primary Examiner*—Tim Heitbrink
(74) *Attorney, Agent, or Firm*—McDonnell Boehnen Hulbert & Berghoff; Sean M. Sullivan (57) ABSTRACT

A seepage system for an injection molding apparatus includes a manifold plate with a first portion and a second portion abutting the first portion, and a seepage passage positioned between the first and second portions. The second portion may have at least a portion of a melt passage, and the seepage passage may have an outlet. The seepage system also has one or more seepage channels, with each seepage channel being connected to and in communication with the seepage passage. Moreover, the seepage system includes one or more seepage bores for receiving the flow of excess material, with each seepage bore being connected to and in communication with one of the seepage channels. Gravity is used to assist the flow of excess material from the one or more seepage bores through the seepage channels and the seepage passage.

25 Claims, 8 Drawing Sheets

U.S. PATENT DOCUMENTS

| | | | |
|---|---|---|---|
| 4,740,151 | 4/1988 | Schmidt et al. | 425/549 |
| 4,743,479 | 5/1988 | Nakamura et al. | 428/35 |
| 4,744,742 | 5/1988 | Aoki | 425/126.1 |
| 4,774,047 | 9/1988 | Nakamura et al. | 264/513 |
| 4,775,308 | 10/1988 | Schad et al. | 425/130 |
| 4,781,954 | 11/1988 | Krishnakumar et al. | 428/35 |
| 4,808,101 | 2/1989 | Schad et al. | 425/130 |
| 4,847,129 | 7/1989 | Collette et al. | 428/35.7 |
| 4,863,369 | 9/1989 | Schad et al. | 425/547 |
| 4,863,665 | 9/1989 | Schad et al. | 264/255 |
| 4,892,699 | 1/1990 | Kudert et al. | 264/328.8 |
| 4,895,504 | 1/1990 | Kudert et al. | 425/133.1 |
| 4,910,054 | 3/1990 | Collette et al. | 428/35.7 |
| 4,923,723 | 5/1990 | Collette et al. | 428/35.7 |
| 4,931,234 | 6/1990 | Schad et al. | 264/40.1 |
| 4,932,858 | 6/1990 | Gellert et al. | 425/564 |
| 4,934,915 | 6/1990 | Kudert et al. | 425/132 |
| 4,944,909 | 7/1990 | Eckardt et al. | 264/255 |
| 4,950,143 | 8/1990 | Krishnakumar | 425/130 |
| 4,954,376 | 9/1990 | Krishnakumar et al. | 428/35.7 |
| 4,957,682 | 9/1990 | Kobayashi et al. | 264/255 |
| 4,965,028 | 10/1990 | Maus et al. | 264/297.2 |
| 4,978,493 | 12/1990 | Kersemakers et al. | 264/255 |
| 4,990,301 | 2/1991 | Krishnakumar | 264/513 |
| 4,994,313 | 2/1991 | Shimizu | 428/36.7 |
| 5,022,846 | 6/1991 | Schmidt | 425/564 |
| 5,028,226 | 7/1991 | De'ath et al. | 425/130 |
| 5,030,077 | 7/1991 | Orimoto et al. | 425/130 |
| 5,032,341 | 7/1991 | Krishnakumar et al. | 264/255 |
| 5,040,963 | 8/1991 | Beck et al. | 425/130 |
| 5,049,345 | 9/1991 | Collette et al. | 264/255 |
| 5,051,227 | 9/1991 | Brun, Jr. et al. | 264/537 |
| 5,077,111 | 12/1991 | Collette | 428/36.7 |
| 5,093,053 | 3/1992 | Eckardt et al. | 264/45.1 |
| 5,094,603 | 3/1992 | Gellert | 425/130 |
| 5,098,274 | 3/1992 | Krishnakumar | 425/133.1 |
| 5,106,284 | 4/1992 | Kobayashi et al. | 425/130 |
| 5,125,817 | 6/1992 | Yamachika | 425/130 |
| 5,131,830 | 7/1992 | Orimoto et al. | 425/130 |
| 5,135,377 | 8/1992 | Gellert | 425/130 |
| 5,141,695 | 8/1992 | Nakamura | 264/255 |
| 5,143,733 | 9/1992 | Von Buren et al. | 425/130 |
| 5,151,025 | 9/1992 | Müller | 425/199 |
| 5,162,121 | 11/1992 | Kawaguchi et al. | 425/130 |
| 5,200,207 | 4/1993 | Akselrud et al. | 425/557 |
| 5,202,074 | 4/1993 | Schrenk et al. | 264/241 |
| 5,215,762 | 6/1993 | Eder et al. | 425/130 |
| 5,221,507 | 6/1993 | Beck et al. | 264/255 |
| 5,223,275 | 6/1993 | Gellert | 425/130 |
| 5,252,268 | 10/1993 | Ohno | 264/40.7 |
| 5,260,012 | 11/1993 | Arnott | 264/69 |
| 5,262,119 | 11/1993 | Smith | 264/255 |
| 5,288,451 | 2/1994 | Schad | 264/328.8 |
| 5,301,838 | 4/1994 | Schmidt et al. | 222/95 |
| 5,380,479 | 1/1995 | Schrenk et al. | 264/241 |
| 5,387,099 | 2/1995 | Gellert | 425/564 |
| 5,407,629 | 4/1995 | Schmidt et al. | 264/513 |
| 5,498,150 | 3/1996 | Check | 425/526 |
| 5,501,593 | 3/1996 | Marcus | 425/547 |
| 5,523,045 | 6/1996 | Kudert et al. | 264/513 |
| 5,573,791 | 11/1996 | Marcus | 425/523 |
| 5,582,788 | 12/1996 | Collette et al. | 264/297 |
| 5,582,851 | 12/1996 | Hofstetter et al. | 425/562 |
| 5,589,130 | 12/1996 | Takada et al. | 264/537 |
| 5,614,233 | 3/1997 | Gellert | 425/549 |
| 5,628,950 | 5/1997 | Schrenk et al. | 264/241 |
| 5,628,957 | 5/1997 | Collette et al. | 264/512 |
| 5,645,786 | 7/1997 | Okada et al. | 264/255 |
| 5,650,178 | 7/1997 | Bemis et al. | 425/130 |
| 5,651,998 | 7/1997 | Bertschi et al. | 425/127 |
| 5,705,202 | 1/1998 | Gellert | 425/549 |
| 5,795,600 | 8/1998 | Rozema | 425/562 |
| 5,830,524 | 11/1998 | Braun | 425/549 |
| 5,843,361 | 12/1998 | Gellert | 264/297.2 |

SEEPAGE SYSTEM FOR AN INJECTION MOLDING APPARATUS

FIELD OF INVENTION

The present invention relates to an improved injection molding apparatus. More specifically, it relates to a seepage system for a valve-gated injection molding apparatus.

BACKGROUND OF THE INVENTION

Valve-gated injection molding devices are well-known in the art. These devices use a reciprocating valve pin seated within a bushing to open and close the front opening of a nozzle, thereby establishing or cutting off the flow of material out the nozzle. One common problem that is faced by these valve-gated injection molding devices is the seepage of excess material backward into the bushing, rather than out of the nozzle. The seepage of excess material into the bushing, or worse yet, through the bushing and into the actuating mechanism that drives the valve pin, can cause the valve pin to lock-up or jam, and render the injection molding device inoperable.

In order to avoid this problem, prior art injection molding devices have typically used a tight fit between the valve pin and its bushing to block the leakage of excess material. The tight fit between the valve pin and its bushing, however, usually results in the break down of the melt material caused by the shearing action from the reciprocating motion of the valve pin on the material confined in the small space between the valve pin and its bushing. Consequently, the breakdown causes the formation of hot pressurized gases and acids that attack the surface of the valve pin and its bushing. The resulting corrosion, wear, and build-up of solidified material usually results in seizure of the valve pin, thereby shortening the operative life of the injection molding device.

One solution to the problems caused by this seepage of excess material into the bushing is disclosed by U.S. Pat. Nos. 4,026,518, 4,433,969, and 5,387,099 to Gellert. Each of the injection molding devices disclosed in these patents has a circumferential opening in its bushings that is vented to the atmosphere through one or more ducts in the bushings and the manifold retaining the bushings. The vented circumferential opening relieves the pressure on the seeping material, allows harmful gases to escape, and permits the excess material trapped between the valve pin and its bushing to remain partially fluid. While this vented circumferential opening has been found to substantially extend the operative life of the injection molding device, providing such a vented circumferential opening, especially its ducts, involves a complex and expensive drilling operation into both the bushing and its corresponding manifold. Moreover, the separate individual ducts do not provide an efficient central channel or passage system for collecting and disposing of the seeping material.

Accordingly, it would be desirable to provide a seepage system that relieves excess material and harmful gases, but does not involve complex and expensive drilling operations. It would also be desirable to provide a seepage system with an efficient central seepage passage for collecting and disposing of seeping material.

SUMMARY OF THE INVENTION

The present invention provides a seepage system for an injection molding apparatus comprising a manifold plate with a first portion and a second portion abutting the first portion, and a seepage passage positioned between the first and second portions. The seepage system also comprises a plurality of seepage channels, with each seepage channel being connected to and in communication with the seepage passage. Moreover, the seepage system also comprises a plurality of seepage bores for receiving the flow of excess material, with each seepage bore being connected to and in communication with one of the seepage channels. Gravity may be used to assist the flow of excess material from the seepage bores through the seepage channels and the seepage passage.

In addition, the present invention provides a seepage system for an injection molding apparatus comprising a manifold plate having a first plate with a first face, and a second plate with a second face abutting the first face. The second plate also has at least a portion of a melt passage. The seepage system further comprises a seepage passage between the first and second plate. The seepage passage is defined by at least a portion of the first and second faces, and has an outlet. Also, the seepage system includes a seepage channel connected to and in communication with the seepage passage, and a seepage bore for receiving the flow of excess material. The seepage bore has an annular channel connected to and in communication with the seepage channel.

DETAILED DESCRIPTION OF PREFERRED EMBODIMENTS

Figure 1:
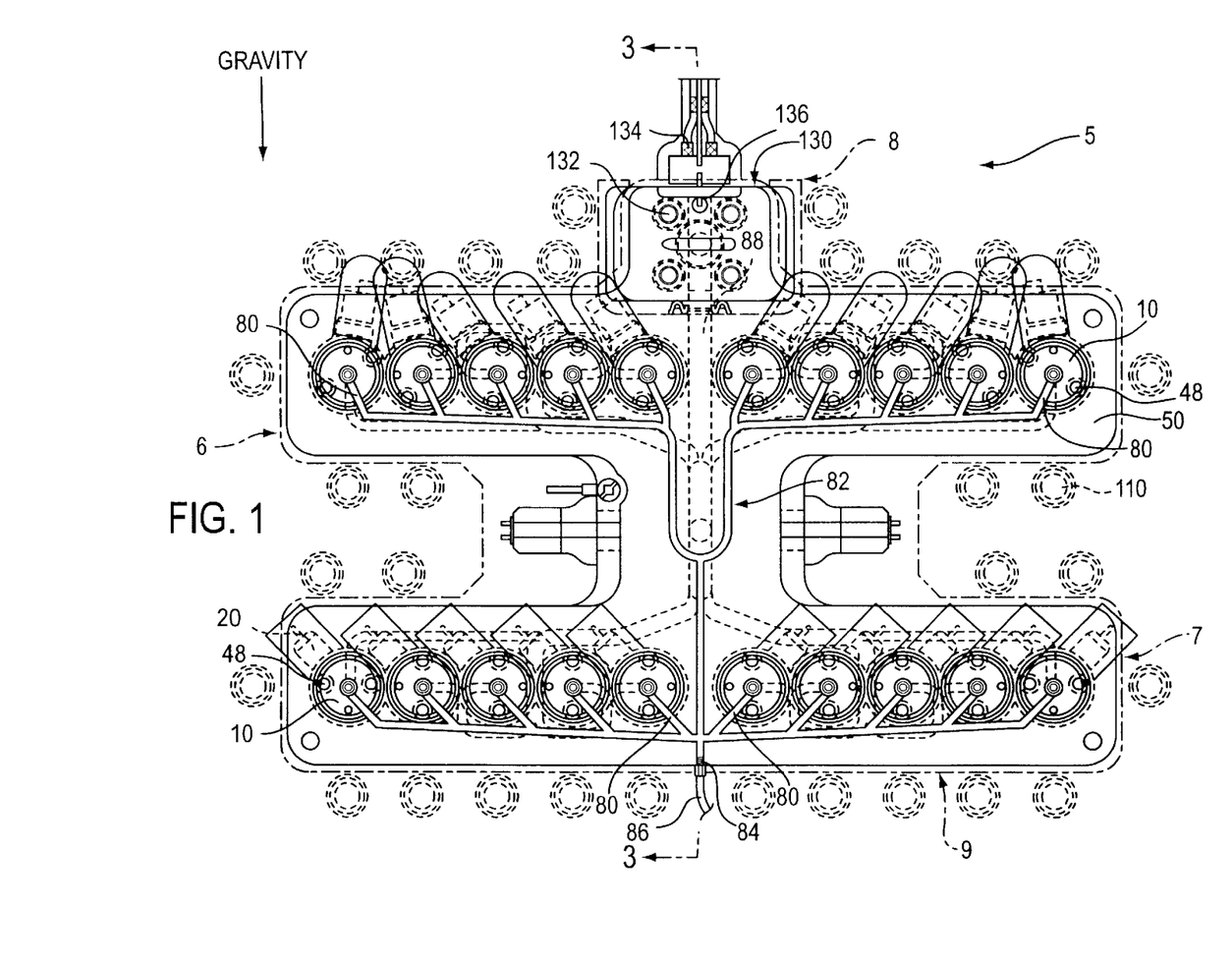
FIG. 1 is a partial cross-sectional side view of an injection molding apparatus with a seepage system of the present invention.
Figure 2:
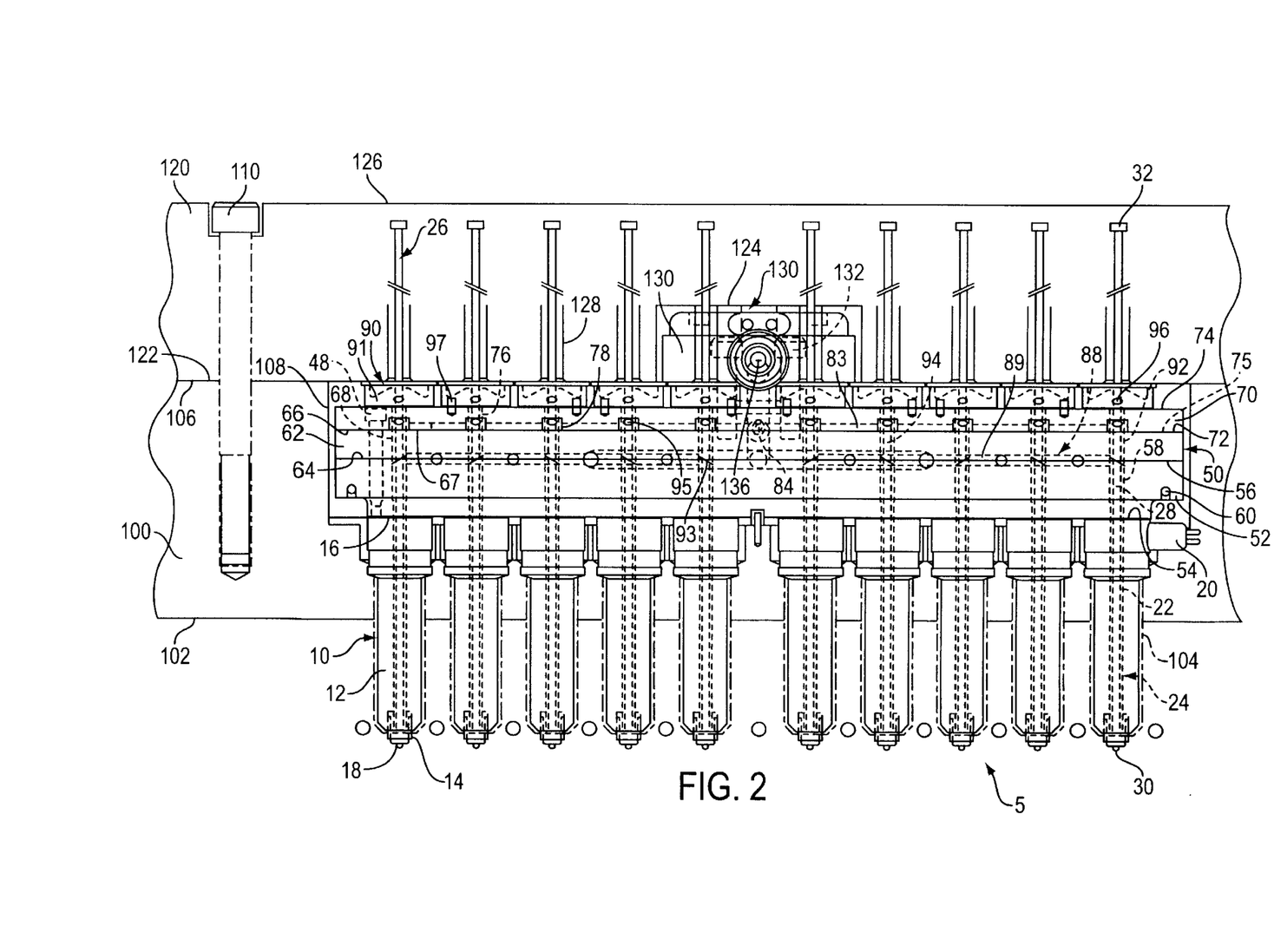
FIG. 2 is a partial cross-sectional top view of the injection molding apparatus and seepage system of FIG. 1.

Turning now to the drawings, FIGS. 1–2 show a preferred embodiment of a multi-cavity injection molding apparatus 5 of the present invention. The injection molding apparatus 5 has a first side 6, a second side 7, a top side 8, and a bottom side 9. The injection molding apparatus 5 also comprises a plurality of nozzles 10, a melt distribution manifold 50, a valve bushing 90, a front plate 100, a back plate 120, and preferably, but not necessarily, a bridge assembly 130. Preferably, the nozzles 10 and the melt distribution manifold 50 are joined together by a plurality of nozzle bolts 48. Similarly, the front plate 100 and the back plate 120 are preferably joined together with a plurality of plate bolts 110. It should also be understood that the injection molding apparatus 5 can have a greater number of plates depending upon the application, and for ease of illustration, only the above-identified plates are shown in FIGS. 1–2.

Although only 20 nozzles are shown in FIG. 1, any desirable number of nozzles (i.e., 16, 32, 64, or more) may be used with the injection molding apparatus 5 of the present invention. Each nozzle 10 has a body 12 with a front tip end 14 and a rear end 16 opposite the front tip end 14. Each nozzle 10 is heated by an integral electrical heating element (not shown) wrapped around the body 12. For more information on this heating element, see U.S. Pat. No. 5,614,233 to Gellert, specifically incorporated herein by reference. The heating element (not shown) has a terminal end 20 positioned near the rear end 16 of each nozzle 10. The front tip end 14 of each nozzle 10 also has a front opening 18. Each nozzle also has a central bore 22 that extends throughout the body 12 from the front tip end 14 to the rear end 16, and is in communication with the front opening 18. The central bore 22 also defines a portion of a central melt channel 24 for the flow of material through each nozzle.

The central bore 22 of each nozzle is also designed to receive an elongated, moveable valve pin 26. Each valve pin 26 has a body 28 with a front tip 30 and a head 32 opposite the front tip 30. Preferably, the body 28 of the valve pin 26 is sized to be smaller in diameter than the central bore 22 of each nozzle 10 to permit the flow of material in the central melt channel 24 around the valve pin 26. The front tip 30 of each valve pin 26 is designed to fit within the front opening 18 of each nozzles 10 to cut off fluid communication between the central melt channel 24 and the front opening 18. In addition, the front tip 30 may be either tapered or squared off, depending on manufacturing and consumer preferences.

Figure 4:
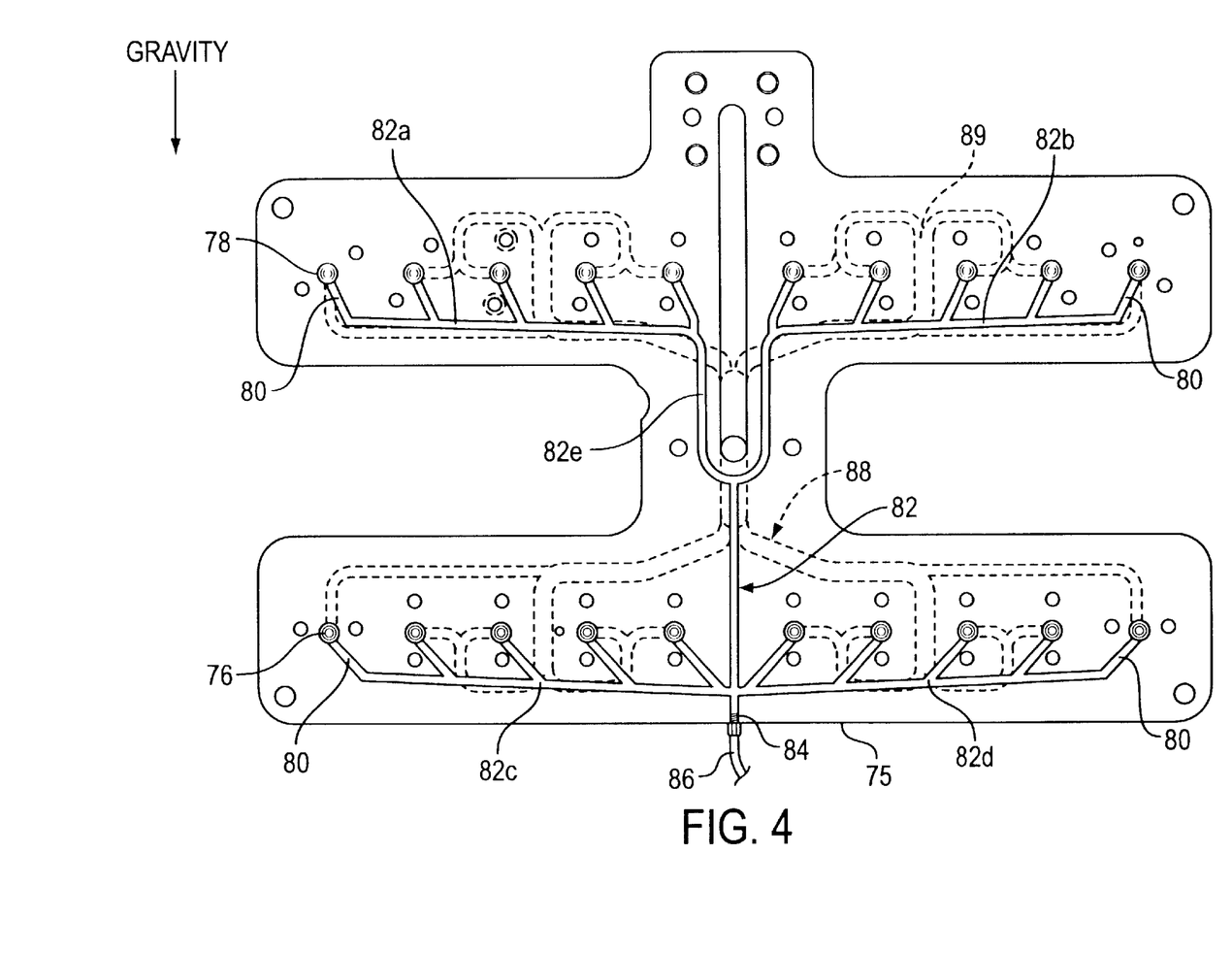
FIG. 4 is a partial cross-sectional side view of the injection molding apparatus and seepage system of FIG. 1.
Figure 5:
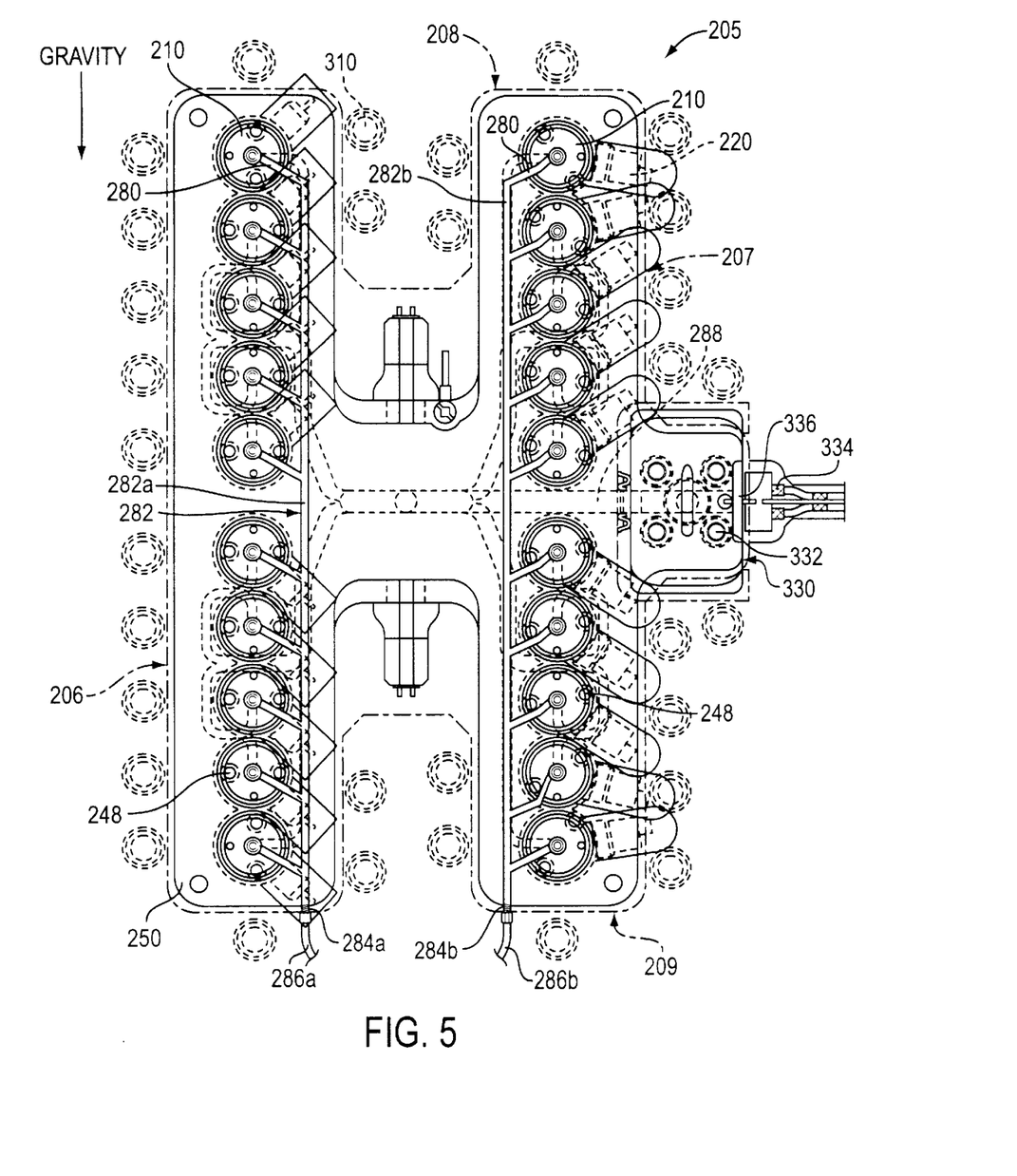
FIG. 5 is a partial cross-sectional side view of an injection molding apparatus with another seepage system of the present invention.
Figure 6:
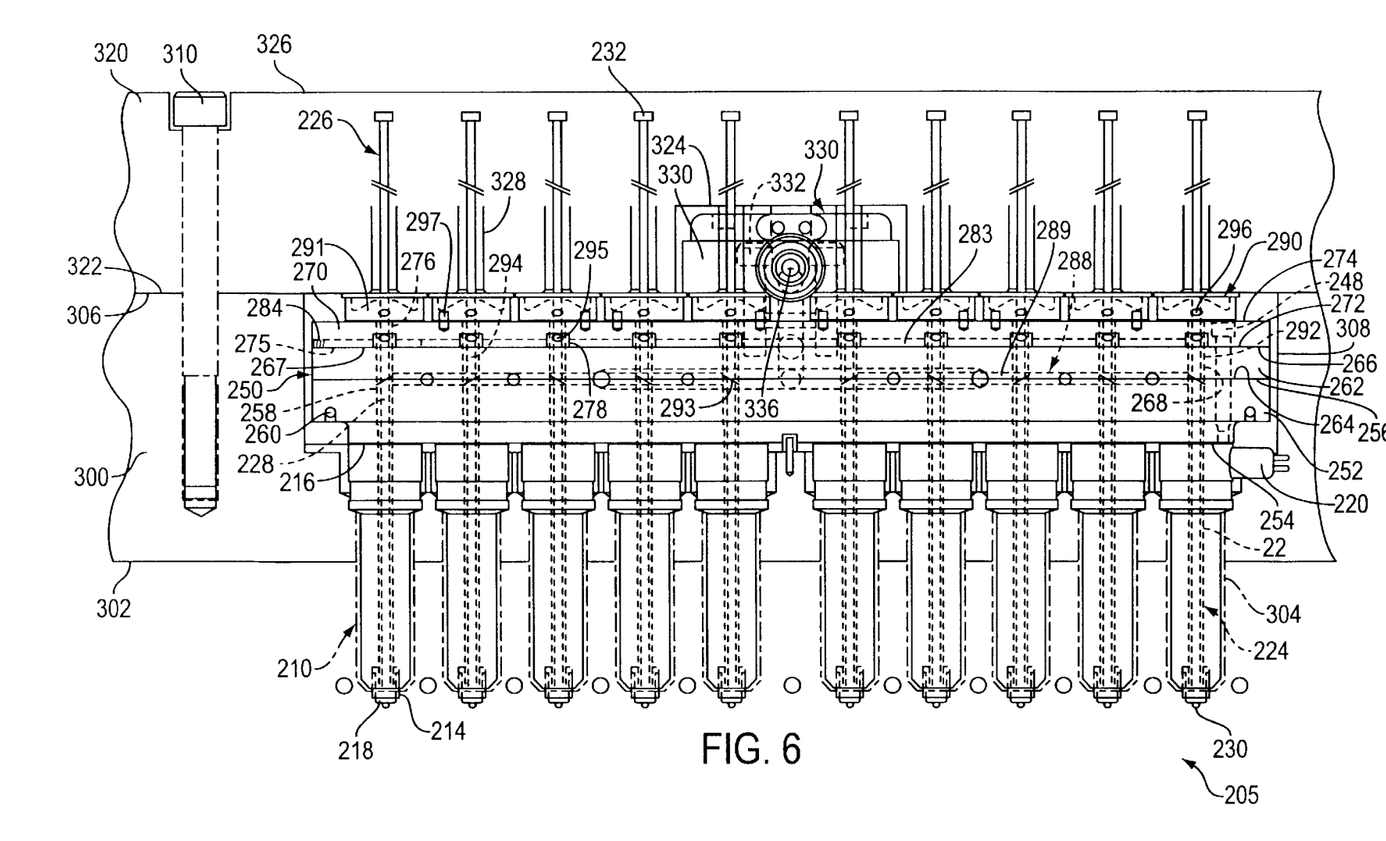
FIG. 6 is a partial cross-sectional top view of the injection molding apparatus and seepage system of FIG. 5.
Figure 7:
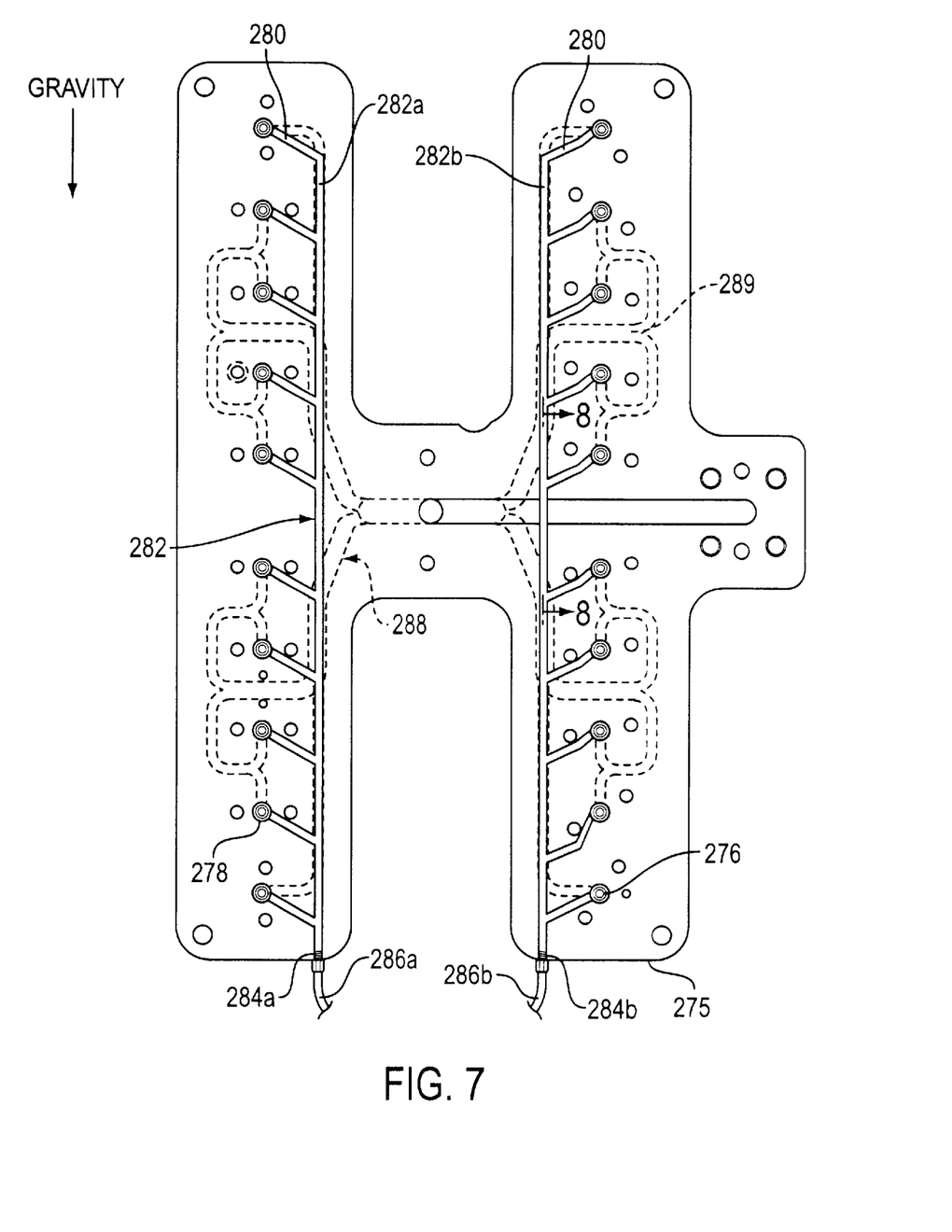
FIG. 7 is a partial cross-sectional side view of the injection molding apparatus and seepage system of FIG. 5.

As best shown in FIGS. 2 and 4, the melt distribution manifold 50 is positioned on a manifold locator 51 between the nozzles 10 and the back plate 120. The melt distribution manifold 50 has a first plate 52, a second plate 62, and third plate 70. The first plate 52 has a front face 54 abutting against the rear ends 16 of the nozzles 10, and a rear face 56 abutting against the second plate 62. The first plate 52 also has a plurality of melt bores 58 aligned with the central bores 22 of the nozzles 10. The melt bores 58 of the first plate 52 are designed to receive the valve pins 26. Moreover, the melt bores 58 further define a portion of the central melt channel 24 for the flow of material through the first plate 52 and around the valve pins 26. In addition, the first plate 52 has an integral electrical heating element 60.

Similarly, the second plate 62 of the melt distribution manifold 50 has a front face 64 abutting against the rear face 56 of the melt distribution manifold 50, and a rear face 66 abutting against the third plate 70. The second plate 62 also has a plurality of melt bores 68 aligned with the melt bores 58 of the first plate 52. Like the melt bores of the first plate 52, the melt bores 68 of the second plate 62 are designed to receive the valve pins 26. Also, at least a portion of each melt bore 68 of the second plate 62 preferably defines a portion of the central melt channel 24 for the flow of material through the second plate 62 and around the valve pin 26 and. Moreover, at least a portion of each melt bores 68 of the second plate 62 is also designed to receive a valve bushings 90, as shown in FIG. 2.

As best shown in FIGS. 2 and 4, the third plate 70 of the melt distribution manifold 50 has a front face 72 abutting against the rear face 66 of the second plate 62, and a rear face 74 abutting against the valve bushings 90. The third plate 70 also has a bottom side 75 corresponding to the bottom side 9 of the injection molding apparatus 5, and a plurality of seepage bores 76 aligned with the melt bores 68 of the second plate 62. Each seepage bore 76 has an annular channel 78 that is connected to and in fluid communication with a seepage channel 80. Each seepage channel 80 is in turn connected to and in fluid communication with a seepage passage 82. As shown in FIG. 4 and described in more detail below, the seepage passage 82 provides a central mechanism for collection of the flow of excess material from the individual seepage channels 80. The seepage passage 82 drains into a seepage outlet 84 that is designed to receive a seepage conduit 86. Preferably, the seepage conduit 86 is threadably connected to the seepage outlet 84.

Figure 3:
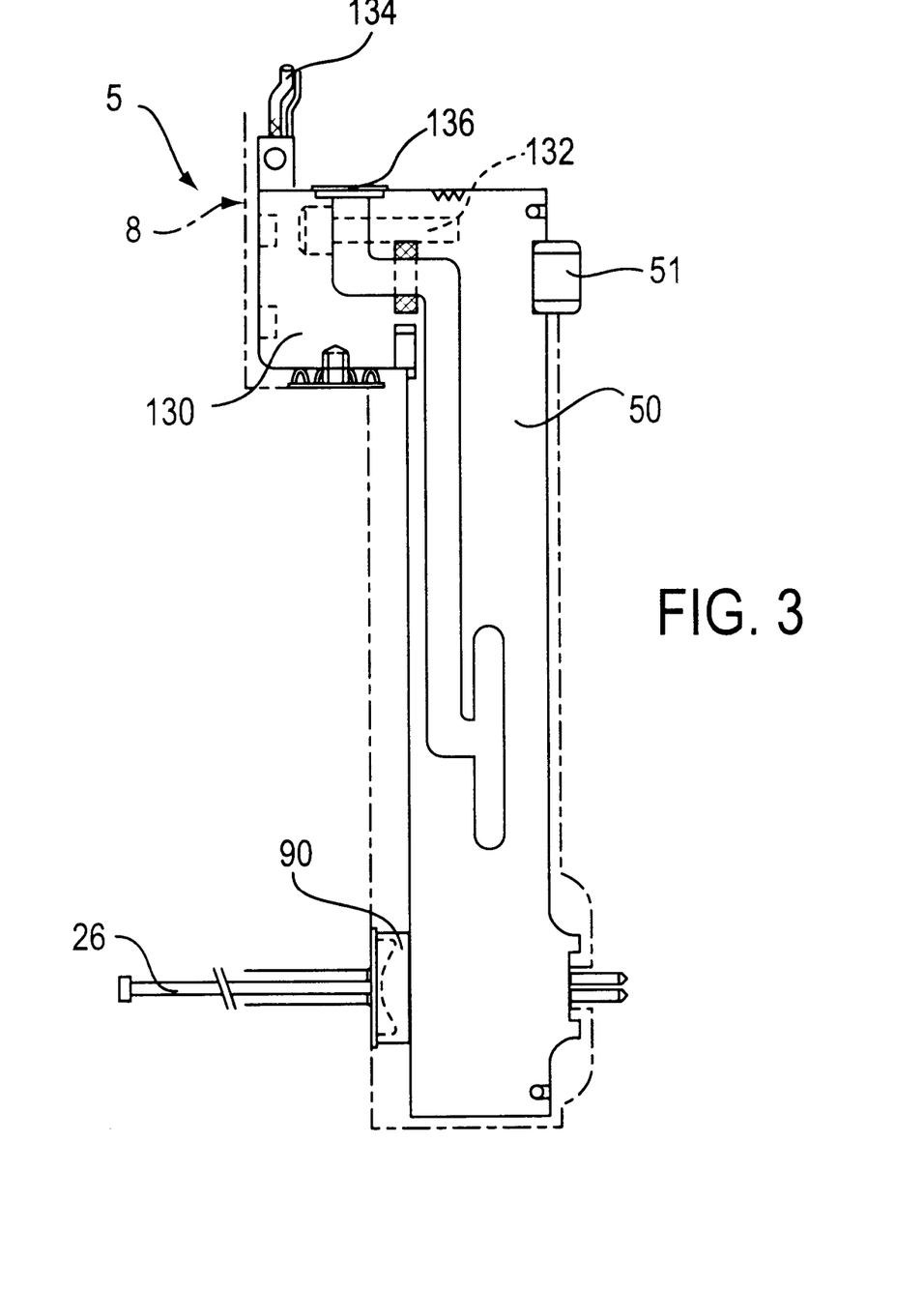
FIG. 3 is a partial cross-sectional view of the injection molding apparatus of FIG. 1 taken along line 3—3.

The seepage passage 82 is preferably comprised of four sections 82a, 82b, 82c, 82d that are interconnected together through a Y-shaped section 82e, as shown in FIG. 3. The Y-shaped section 82e is also connected to and in fluid communication with the seepage outlet 84. Preferably, each of the four sections 82a, 82b 82c, 82d is pitched to slope downward toward the Y-shaped section 82e to facilitate the flow of excess material into the Y-shaped section 82e and out through the seepage outlet 84 using the force of gravity.

The seepage passage 82 is preferably milled into the front face 72 of the third plate 70. As a result, the seepage passage 82 is defined by a milled out portion 83 of the front face 72 of the third plate 70, and a portion 67 of the rear face 66 of the second plate 62 that faces the milled out portion 83. In this arrangement, the expensive and complex operation of drilling out the seepage passage in the melt distribution manifold can be avoided. Moreover, this arrangement provides the flexibility of being able to mill any desirable configuration or design for the seepage passage.

Preferably, but not necessarily, the first plate 52, the second plate 62, and the third plate 70 of the melt distribution manifold 50 are integrally brazed together to form a single manifold plate. The technology used to integrally braze these three plates together is well-known in the art. For instance, a nickel brazing paste may be applied between the rear face 56 of the first plate 52 and the front face 64 of the second plate 62, and between the rear face 66 of the second plate 62 and the front face 72 of the third plate 70. The plates 52, 62, 70, may then be heated in a vacuum furnace (not shown) at a sufficient temperature and for a sufficient heating time to first melt the paste causing it to run all around the faces 56, 64, 66, 72 and then to braze them together. As is known, brazing in a vacuum furnace provides an improved bond between the three plates 52, 62, 70 and a strong integral melt distribution manifold 50.

The melt distribution manifold 50 also has a melt passage 88 with a lateral portion 89, as best shown in FIGS. 1–2. Preferably, the lateral portion 89 of the melt passage 88 is located within the first plate 52 and/or the second plate 62 of the melt distribution manifold 50. More preferably, the lateral portion 89 of the melt passage 88 is positioned between the first plate 52 and the second plate 62 of the melt distribution manifold 50, as shown in FIG. 2. In this latter arrangement, the melt passage 88 may be milled, rather than drilled, into the rear face 56 of the first plate 52 and the front face 64 of the second plate 62.

The injection molding apparatus 5 also comprises a plurality of valve bushings 90 positioned between the melt distribution manifold 50 and the back plate 120. Each valve bushing 90 is generally T-shaped with a middle portion 91 and a stem portion 92 extending outward from the middle portion 91 to an end 93. The end 93 is preferably angled to direct the flow of material from the melt passage 88 into the central melt channel 24. Each valve bushing 90 also has a central bore 94 extending through the middle portion 91 and the stem portion 92. Each central bore 94 is designed to receive one of the valve pins 26. In order to avoid excessive leakage of material between each valve bushing 90 and its respective valve pin 26, the clearance between them is preferably small with a close tolerance.

The stem portion 92 of the valve bushing 90 further includes a seepage slot 95 in fluid communication with both the central bore 94 and the annular channel 78 of the third plate 70 of the melt distribution manifold 50. The seepage slot 95 permits excess material flowing through the stem portion 92 of the valve bushing 90 to drain into the annular channel 78 of the third plate 70 of the melt distribution manifold 50. The middle portion 91 of each valve bushing 90 has an annular chamber 96 and an anti-rotational dowel pin 97 to fix the rotational position of the valve bushing 90.

As shown in FIG. 2, the injection molding apparatus 5 also comprises a front plate 100. The front plate 100 has a front end 102 with a plurality of nozzle seat openings 104, and a rear end 106 with a plate seat opening 108. The nozzle seat openings 104 are designed to receive the nozzles 10, with the rear end 16 of each nozzle 10 being seated within a nozzle seat opening 104. The plate seat opening 108 is designed to receive the melt distribution manifold 50, as shown in FIG. 2. The rear end 106 of the front plate 100 abuts against the back plate 120.

The back plate 120 has a front end 122 with a bridge seat opening 124, and a rear end 126. The front end 122 abuts against the rear end 106 of the front plate 100. The back plate 120 also preferably has a plurality of pin bores 128 aligned with the central bores 94 of the valve bushings 90. The pin bores 128 are also designed to receive the valve pins 26. Preferably, there is a pin bore 128 for each valve pin 26. The back plate 120 also has a piston assembly (not shown) in communication with each pin bore for actuating the valve pins 26 by pushing their heads 32 forward towards and backward away from the front opening 18 of the nozzles 10.

As shown in FIGS. 1–2 and 4, the bridge assembly 130 is positioned in the bridge seat opening 124 of the back plate 120 near the top side 8 of the injection molding apparatus 5. In this arrangement, the bridge assembly 130 is approximately 180° away from the seepage outlet 84. Preferably, the bridge assembly 130 is joined together with the melt distribution manifold 50 by bridge bolts 132. In addition, the bridge assembly 130 may also be bolted to the back plate 120. The bridge assembly 130 also has a heater 134, and a melt inlet passage 136 in fluid communication with the melt passage 88 and an injection cylinder (not shown).

The injection molding apparatus 5 of the present of invention operates in the following manner. An injection cylinder (not shown) feeds a molten material, such as polypropylene, into the melt inlet passage 136 of the bridge assembly 130. From the melt inlet passage 88, the material flows into the melt passage 88 of the melt distribution manifold 50. The material then flows from the lateral portion 89 of the melt passage 88 into the central melt channel 24 for each nozzle 10. The flow of material is directed into each central melt channel 24 by the angled end 93 of the stem portion 92 of each valve bushing 90.

The material flows through each central melt channel, around the respective valve pin 26, and, as long as the valve pin 26 is withdrawn backward from the front opening 18, out the front opening 18 of each nozzle. As each valve pin is moved backward and forward to open and close the front opening of its respective nozzle, excess material may be forced into the valve bushing and away from the front opening of each nozzle by the reciprocating movement of the valve pin. In other words, excess material may climb along each valve pin 26 into the central bore 94 of the corresponding valve bushing 90.

The excess material, which may include gases resulting from any breakdown of molten material, then flows from the central bore 94 into the seepage slot 95 of the stem portion 92 of each valve bushing 90. The excess material next flows out of the seepage slot 95, into the corresponding annular channel 78, and then into the corresponding seepage channel 80 of the third plate 70 of the melt distribution manifold 50. From each seepage channel 80, the excess material flows into the seepage passage 82. In particular, the excess material flows into one of the four sections 82a, 82b, 82c, 82d of the seepage passage, depending on from which seepage channel 80 the excess material is flowing. The excess material then flows from one of the sections 82a, 82b, 82c, 82d into the Y-shaped section 82e of the seepage passage 82. Since the seepage outlet 84 is located on the bottom side 75 of the third plate 70 of the melt distribution manifold 50, gravity assits the excess material through the Y-shaped section 82e of the seepage passage 82 and out the seepage outlet 84. The excess material, which may include any harmful or undesirable gases, is then carried away from the injection molding apparatus through the seepage conduit 86. The excess material from the seepage conduit 86 may then be disposed of in the proper manner.

Although excess material will preferably flow out of the seepage slot of each valve bushing, some excess material that flows past the seepage slot may be captured by the annular chamber 96 of the middle portion 91 of each valve bushing 90. Any excess material filling the annular chamber 96 will eventually harden and solidify, since the middle portion 91 of the valve bushing 90 is preferably not heated. The hardened and solidified excess material in the annular chamber 96 provides a seal between the middle portion 91 of each valve bushing 90 and its respective valve pin 26. Such a seal works to prevent further excess material from passing through the valve bushing 90 and into the piston assemblies of the back plate 120, thereby keeping the reciprocating valve pins 26 from jamming or locking up.

Although not shown, in order to assist the flow of excess material through the seepage passage and/or the seepage conduit, a vacuum or pump may be connected to the seepage passage or the seepage conduit to supplement or even replace the force of gravity. In addition, a vacuum or pump (not shown) may be used to clean or remove excess material from the seepage channels, the seepage passage, and/or the seepage conduits in between injection cycles or while the injection molding apparatus is not in operation. Also, it should be understood that the injection pressure applied to the molten material may also assist the flow of excess material through the seepage channels, the seepage passage, and/or the seepage conduits.

FIGS. 5–8 show an alternative embodiment for the injection molding apparatus of the present invention. This alternative embodiment is identical to the preferred embodiment shown in FIGS. 1–4, with only a few exceptions. In order to avoid redundancy and unnecessary repetition, only the differences between the two embodiments will be described below. In addition, for the elements of the alternative embodiment shown in FIGS. 5–8, a "2" will be added to the reference numerals of the corresponding elements of the preferred embodiment shown under 100, and a "3" will be added to the reference numerals of the corresponding elements over 100. For instance, the seepage passage and the melt-inlet passage of the alternative embodiment shown in FIGS. 5–8 will be referred to by the reference numerals 282 and 336, respectively.

Figure 8:
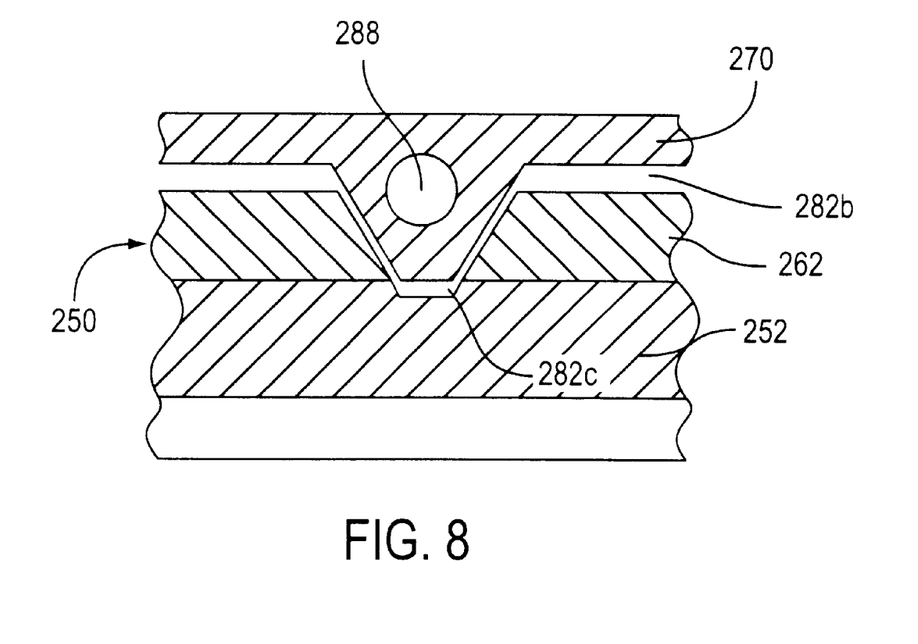
FIG. 8 is a partial cross-sectional view of the injection molding apparatus and seepage system of FIG. 7 taken along line 8—8.

The primary differences between the two embodiments are that, in the alternative embodiment shown in FIGS. 5–8, the melt inlet passage 336 of the bridge assembly 330 is located on the second side 207 of the injection molding apparatus 205, rather than on the top side 208, and the third plate 270 of the melt distribution manifold 250 has a seepage passage 282 with a different configuration. The seepage passage 282 includes a first portion 282a that drains into a first seepage outlet 284a, and a second portion 282b that drains into a second seepage outlet 284b. In the event that a portion of the melt passage 88 runs through the third plate 270 of the melt distribution manifold 250, the second portion 282b of the seepage passage 282 preferably has a valley portion 282c that goes under the melt passage, as shown in FIG. 8.

Like the previous embodiment, each seepage outlet 284a, 284b is preferably threaded to receive a first seepage conduit 286a and a second seepage conduit 286b, respectively. As with the seepage conduit 86, the first and second seepage conduits 286a, 286b carry excess material away from the injection molding apparatus. The first and second seepage conduits 286a, 286b may be separate from one another, or joined together at some point to form a single seepage conduit. The seepage outlets 284a, 284b are positioned on the bottom side 275 of the third plate 270 of the melt distribution manifold 250 near the bottom side 209 of the injection molding apparatus 205. Since the melt inlet passage 336 of the bridge assembly 330 is positioned on the side of the injection molding apparatus, the first and second seepage outlets 284a, 284b are positioned approximately 90° away from the melt inlet passage 336.

The injection molding apparatus shown in FIGS. 5–8 operates in the following manner. Like the preferred embodiment shown in FIGS. 1–4, excess material climbs along each valve pin 226 into the stem portion of its respective valve bushing 290. The excess material, which may include gases resulting from any breakdown of melt material, then flows out the seepage slot 295, into the annular channel 278, and into the seepage channel 280. From the seepage channel, the excess material flows into its corresponding seepage passage 282, either the first portion 282a or the second portion 282b. With respect to the second portion 282b of the seepage passage 282, excess material also flows through the valley portion 282c to avoid the melt passage 288. From its respective portion of the seepage passage 282a, 282b, the excess material drains out the appropriate seepage outlet 284a, 284b and into the corresponding seepage conduit 286a, 286b. Since the seepage outlets 284a, 284b are located on the bottom side 275 of the third plate 270 of the melt distribution manifold 250, gravity assists the flow of excess material through the first and second portions 282a, 282b of the seepage passage 282 and out the seepage outlets 284a, 284b. The excess material, which may include any harmful or undesirable gases, is then carried away from the injection molding apparatus by the seepage conduits 286a, 286b for disposal.

It should also be readily apparent from the forgoing description and accompanying drawings that the injection molding apparatus of the present invention is an improvement over the prior art injection molding devices. For instance, the apparatus of the present invention uses a three-plate manifold that allows the seepage passage, as well as at least a portion of the melt passage, to be milled into the manifold. As a result, the present invention overcomes the disadvantages associated with the prior art injection molding devices by avoiding the expensive and complex operation of completely drilling out a seepage passage and a melt passage. In addition, by using a central seepage passage that collects excess material from a plurality of seepage channels and that drains into only one or two outlets connected to a conduit, the present invention provides an efficient seepage system for collecting, removing, and disposing of seeping material.

Those skilled in the art to which the invention pertains may make modifications and other embodiments employing the principles of this invention without departing from its spirit or essential characteristics, particularly upon considering the foregoing teachings. For instance, the threads of the seepage outlets, as well as the threads of their respective seepage conduits, may be replaced with some other fastening feature. In addition, alternative desirable shapes and configurations may be used for the seepage channels and passages, depending on manufacturing and consumer preferences. Moreover, the seepage system of the present invention may be readily adapted for use with injection molding apparatus other than the injection molding apparatus described and shown in the present application. Accordingly, the described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A seepage system for an injection molding apparatus comprising:
   a manifold plate having at least a first portion and a second portion adjacent the first portion;
   a seepage passage positioned between the first and second portions;
   a plurality of seepage channels, each seepage channel being connected to and in communication with the seepage passage; and
   a plurality of seepage bores for receiving flow of excess material, each seepage bore being connected to and in communication with one of the seepage channels.

2. The seepage system of claim 1 wherein the second portion also includes at least a section of a melt passage in communication with the seepage bores.

3. The seepage system of claim 1 wherein at least a section of the seepage passage is milled into at least one of the first and second portions.

4. The seepage system of claim 1 wherein each seepage bore has an annular channel connected to and in communication with one of the seepage channels.

5. The seepage system of claim 1 wherein the seepage passage also has an outlet.

6. The seepage system of claim 5 further comprising a conduit connected to the outlet for carrying away excess material from the seepage passage.

7. The seepage system of claim 1 wherein the each seepage bore is capable of receiving a valve bushing having a seepage slot in communication with one of the seepage channels.

8. The seepage system of claim 7 wherein the valve bushing is capable of receiving a valve pin.

9. The seepage system of claim 1 wherein the manifold plate further comprises a third portion adjacent the second portion opposite the first portion, the third and second portions forming at least a melt passage between them.

10. A seepage system for an injection molding apparatus comprising:

a manifold plate having at least a first plate with a first face, and a second plate with a second face abutting the first face, the second plate also having at least a portion of a melt passage;

a seepage passage between the first and second plate, the seepage passage being defined by at least a portion of the first and second faces, the seepage passage also having an outlet;

a seepage channel connected to and in communication with the seepage passage; and a seepage bore for receiving flow of excess material, the seepage bore having an annular channel connected to and in communication with the seepage channel, the seepage bores also being in communication with the melt passage.

11. The seepage system of claim 10 wherein at least a portion of the seepage passage slants downward.

12. The seepage system of claim 10 wherein at least a portion of the seepage passage is milled into at least one of the first face of the first plate and the second face of the second plate.

13. The seepage system of claim 10 wherein the seepage passage bas four sections interconnected through a Y-shaped section, the Y-shaped section being connected to and in communication with the outlet.

14. The seepage system of claim 10 wherein the seepage passage has a first section with a first outlet, and a second section with a second outlet.

15. The seepage system of claim 14 further comprising a first conduit connected to the first outlet for carrying away excess material from the first section of the seepage passage, and a second conduit connected to the second outlet for carrying away excess material from the second section of the seepage passage.

16. The seepage system of claim 10 further comprising a conduit connected to the outlet for carrying away excess material from the seepage passage.

17. The seepage system of claim 10 wherein the each seepage bore is capable of receiving a valve bushing having a seepage slot in communication with one of the seepage channels.

18. The seepage system of claim 17 wherein the valve bushing is capable of receiving a valve pin.

19. The seepage system of claim 10 wherein the manifold plate further comprises a third plate abutting the second plate opposite the first portion, the third and second plates forming the melt passage between them.

20. The seepage system of claim 10 wherein the seepage passage has a valley portion to avoid the melt passage.

21. The seepage system of claim 10 wherein the first and second plates are brazed together.

22. The seepage system of claim 19 wherein the first, second, and third plates are brazed together.

23. A seepage system for an injection molding apparatus comprising:

a manifold plate having at least a first portion and a second portion adjacent the first portion;

a seepage passage positioned between the first and second portions;

a plurality of seepage channels, each seepage channel being connected to and in communication with the seepage passage; and a plurality of seepage bores for receiving flow of excess material, each seepage bore being connected to and in communication with one of the seepage channels;

wherein gravity assists the flow of excess material from the seepage bores through the seepage channels and the seepage passage.

24. The seepage system of claim 23 wherein at least a section of the seepage passage is milled into at least one of the first and second portions.

25. The seepage system of claim 23 wherein the seepage passage also has a bottom side with an outlet.

* * * * *